(12) United States Patent
Fabre

(10) Patent No.: US 9,834,300 B2
(45) Date of Patent: Dec. 5, 2017

(54) DEVICE FOR CONTROLLING BLADE ANGLE, AND PROPELLER

(71) Applicant: SNECMA, Paris (FR)

(72) Inventor: Adrien Fabre, Moissy-Cramayel (FR)

(73) Assignee: SNECMA, Paris (FR)

( * ) Notice: Subject to any disclaimer, the term of this patent is extended or adjusted under 35 U.S.C. 154(b) by 456 days.

(21) Appl. No.: 14/440,868

(22) PCT Filed: Oct. 28, 2013

(86) PCT No.: PCT/FR2013/052577
§ 371 (c)(1),
(2) Date: May 5, 2015

(87) PCT Pub. No.: WO2014/072614
PCT Pub. Date: May 15, 2014

(65) Prior Publication Data
US 2015/0284069 A1    Oct. 8, 2015

(30) Foreign Application Priority Data

Nov. 6, 2012 (FR) ...................... 12 60539

(51) Int. Cl.
*B64C 11/32* (2006.01)
*F01D 7/00* (2006.01)
(Continued)

(52) U.S. Cl.
CPC ............ *B64C 11/06* (2013.01); *B64C 11/385* (2013.01)

(58) Field of Classification Search
CPC .... F04D 29/323; F04D 29/362; F04D 29/364; F01D 7/00; F01D 7/02; B64C 11/325;
(Continued)

(56) References Cited

U.S. PATENT DOCUMENTS 1,250,263 A * 12/1917 Yates .................... B64C 11/343
 416/136
1,879,935 A *  9/1932 Hill ........................ B64C 11/343
 416/136
(Continued)

FOREIGN PATENT DOCUMENTS

EP    1832509    9/2007
GB    2442147    3/2008

OTHER PUBLICATIONS

French Preliminary Search Report (FR 1260539) dated Jun. 3, 2013 (7 pages).
(Continued)

*Primary Examiner* — Woody Lee, Jr.
*Assistant Examiner* — Joshua R Beebe
(74) *Attorney, Agent, or Firm* — Blakely Sokoloff Taylor & Zafman

(57) ABSTRACT

The invention relates to a device (1) for controlling the setting of the blades (2) of a rotor (3) of a propeller, including a radial shaft (6), the rotation of which modifies the setting of the blade (2), a main spring (13), a first end (14) of which is connected to the rotor (3) and a second end (15) of which is connected to a part (8, 10) having an axial movement which drives the rotation of the radial shaft, and has a movement, the travel of which is offset relative to the first end in a direction (7) that is orthogonal to the axial direction (5), the main spring exerting a resilient force which aims to move the parts toward a position in which the cord of the profile of the blade is orthogonal to the plane of rotation of the propeller, in the absence of part control by means of a jack.

10 Claims, 10 Drawing Sheets

(51) Int. Cl.
*B64C 11/06* (2006.01)
*B64C 11/38* (2006.01)

(58) Field of Classification Search
CPC ....... B64C 11/30; B64C 11/303; B64C 11/32; B64C 11/34; B64C 11/36; B64C 11/06; Y02T 50/66; Y02E 10/723; F05D 2220/325; F05D 2220/324; F05D 2260/50; F05D 2260/52; F05D 2260/74; F05D 2260/79; F05D 2260/75; F03D 7/0224; F02C 9/58
See application file for complete search history.

(56) References Cited

U.S. PATENT DOCUMENTS

| | | | |
|---|---|---|---|
| 2,801,701 A | 8/1957 | Coar | |
| 2,948,344 A | 8/1960 | Biermann | |
| 3,393,748 A * | 7/1968 | Barnes | B64C 11/325 416/157 R |
| 4,316,698 A * | 2/1982 | Bertoia | F03D 7/0224 416/11 |
| 4,657,484 A * | 4/1987 | Wakeman | B64C 11/306 415/130 |
| 4,915,586 A * | 4/1990 | Williams | B64C 11/28 416/129 |
| 5,286,166 A * | 2/1994 | Steward | B63H 3/008 416/136 |
| 5,542,818 A | 8/1996 | Monvaillier et al. | |
| 6,548,913 B2 * | 4/2003 | Jang | F03D 7/0224 290/55 |

OTHER PUBLICATIONS

International Search Report (PCT/FR2013/052577) dated Mar. 4, 2014.

* cited by examiner

DEVICE FOR CONTROLLING BLADE ANGLE, AND PROPELLER

FIELD OF THE INVENTION

The invention relates to a control device for setting the blade angle of the blades of a propeller rotor, and a propeller comprising such a device.

PRESENTATION OF THE PRIOR ART

Turbo machine propellers comprising at least one rotor and blades with variable geometric blade angle are known from the prior art.

The geometric blade angle is the angle formed by the cord of the profile of the blade and the plane of rotation of the propeller.

For this purpose, as illustrated in FIG. 1, a device is known comprising a radial shaft 102 connected to the blade 100 by a pivot, a tie rod 103 whereof axial displacement controls rotation of the radial shaft, and an asymmetrical piece to which all the tie rods are attached.

An actuator 104 controls axial displacement of the asymmetrical piece, causing axial displacement of the tie rods 103, and uniformly regulates the blade angle of all the blades.

In the absence of control by the actuator, for example following breakdown of the unit regulating the actuator or breakdown of the actuator, due to their inertia the blades tend to adopt a blade angle at 0° relative to the plane of rotation of the propeller, that is, when the cord of the profile of the blade is orthogonal to the aerodynamic flow.

The disadvantage of this blade angle, that it is generating an excessive drag, making the aircraft difficult to control, especially in takeoff phase.

Consequently, control devices for setting the blade angle of the blades conventionally comprise a mechanism for leading the blades towards a position in which the cord of the profile of the blade is orthogonal to the plane of rotation of the propeller. This position is called "feathered position" by the man skilled in the art.

The advantage of the feathered position is generating minimal drag, and low torque in "windmilling" (Terminology used by the man skilled in the art to designate an operating mode in which the engine is stopped and the propeller is driven in rotation by the relative wind).

Two types of mechanism have been proposed in the prior art.

A first mechanism, illustrated In FIG. 1, employs counterweights 101 to directly counter the inertia of the blades.

However, this mechanism has a large mass. By way of example, in unshrouded propeller fans, the mass of the counterweights of each blade represents around 50% of the mass of a blade. The total mass of these counterweights is typically around 100 kg per engine.

Besides, the rotating structures of the fan undergo the centrifugal load of these counterweights.

Another drawback of this mechanism is that for settings beyond the "flat" blade angle (blade angle at 0°), it tends to bring the propeller towards a blade angle at −90° (feathered position, but the leading edge towards the rear). A double-action actuator is therefore needed to counter this effect during reversing.

A second mechanism known from the prior art is based on return springs, as in U.S. Pat. No. 2,801,701 and U.S. Pat. No. 2,948,344. However, this type of mechanism operates only for tourist aircraft, where the blade angle is always positive. Also, it needs a powerful actuator to counter the resilient force exerted by the spring at the end of the blade angle range (that is, close to 0°). This type of actuator can be utilised on certain aircraft only.

PRESENTATION OF THE INVENTION

To eliminate the disadvantages of the prior art, the invention proposes a control device of the blade angle of the blades of a rotor of a propeller, comprising:
- a radial shaft whereof the rotation modifies the blade angle of the blade,
- pieces capable of being moved jointly according to an axial direction of the device, so as to cause rotation of the radial shaft,
- at least one actuator controlling displacement of the pieces according to the axial direction;

characterized in that it comprises:
- at least one main spring with a first end connected to the rotor, and with a second end connected to one of the pieces, the second end showing a displacement with a course which is shifted relatively to the first end according to a direction orthogonal to the axial direction,
- the main spring exerting resilient force tending to displace the pieces towards a position in which the cord of the profile of the blade is orthogonal to the plane of rotation of the propeller, in the absence of control of the pieces by the actuator.

An advantage of the invention is to propose a light control device, not needing the use of counterweights.

Another advantage of the invention is to propose a device minimising force to the supplied for the actuator.

Another advantage of the invention is to enable return to independent feathered position for each blade. This prevents common failure.

Finally, another advantage of the invention is to propose a robust system simple to execute.

PRESENTATION OF FIGURES

Other characteristics and advantages of the invention will emerge from the following description which is purely illustrative and non-limiting, and must be considered in light of the appended drawings, in which.

DETAILED DESCRIPTION

Description of the Device

Figure 1:
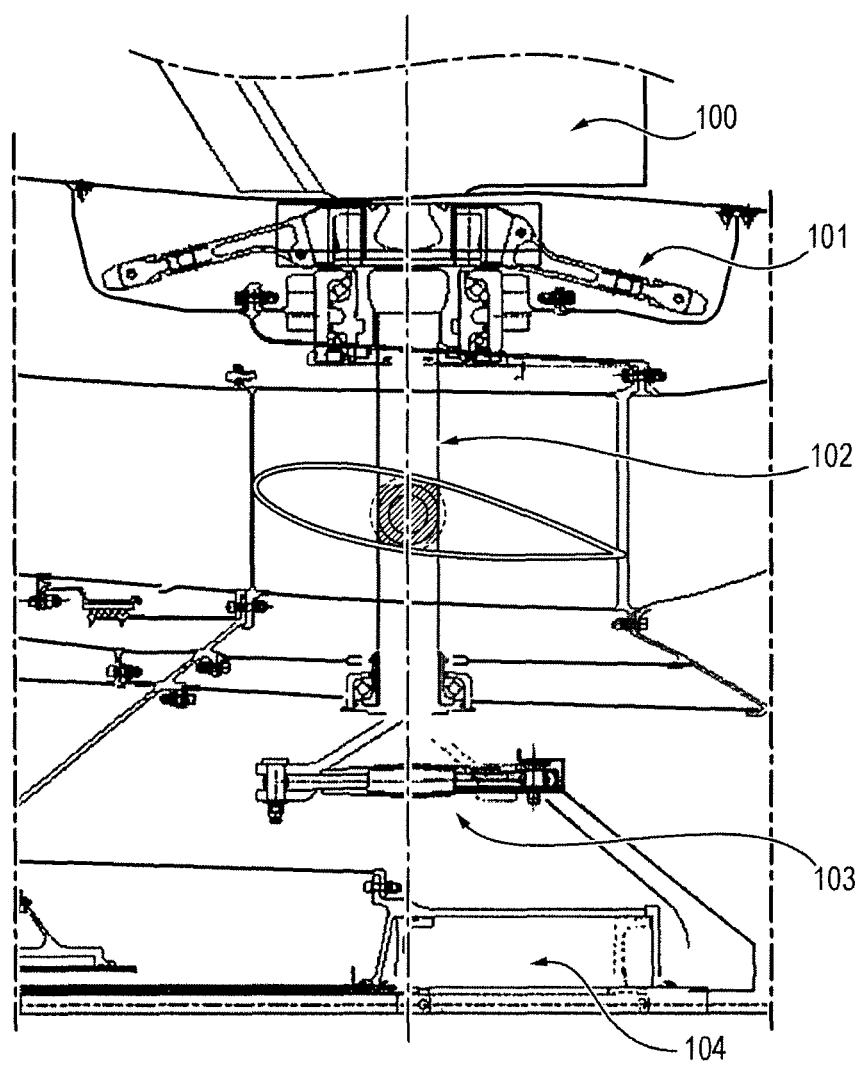
FIG. 1 is a representation of a mechanism of the prior art.
Figure 2:
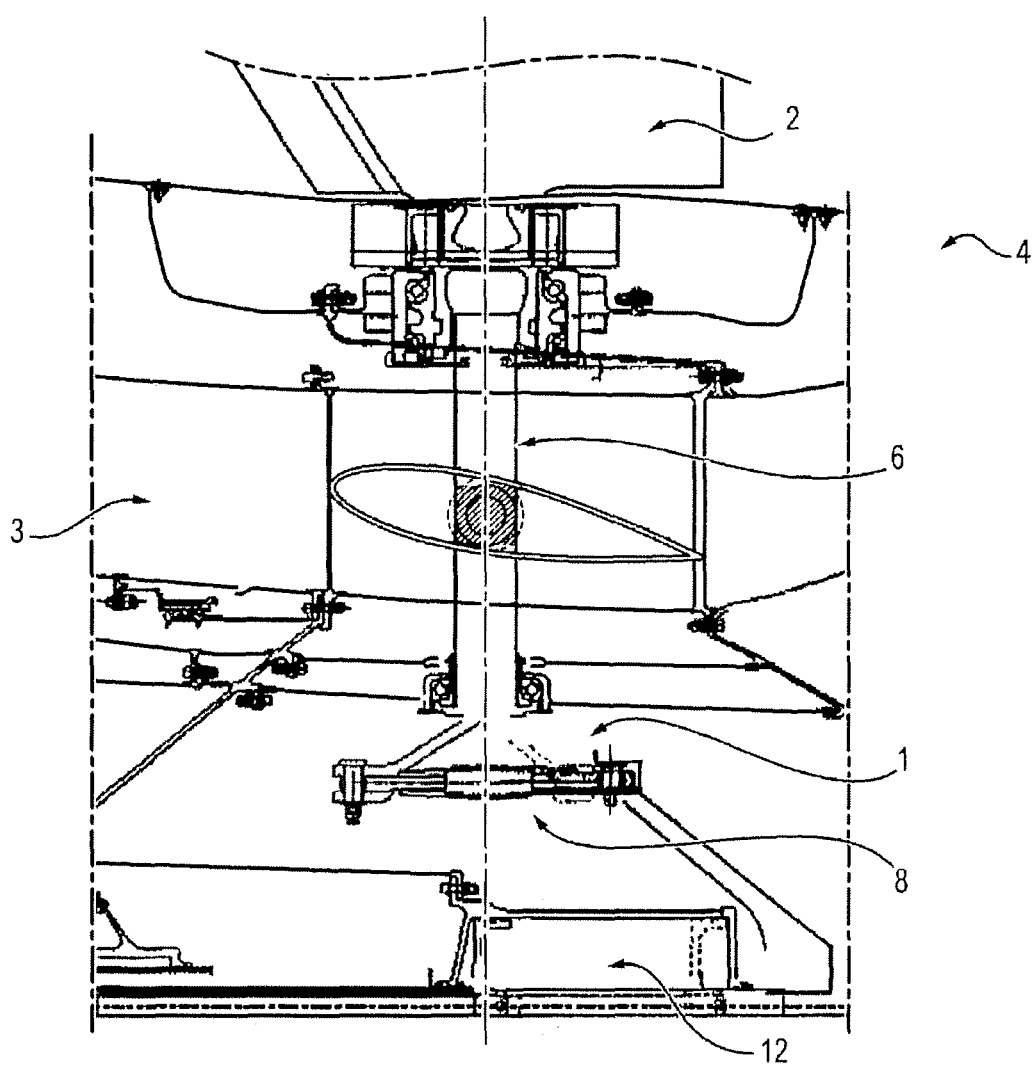
FIG. 2 is a partial representation of a propeller on which the device is capable of being integrated.

FIGS. 2 to 8 illustrate an embodiment of a control device 1 of the blade angle of the blades 2 of a rotor 3 a propeller 4.

As mentioned above, the geometric blade angle is the angle formed by the cord of the profile of the blade 2 and the plane of rotation of the propeller 4. Only the term "blade angle" will be used hereinbelow, as is currently used in the prior art.

It is noted that the blade angle is an algebraic value. For example, a blade angle at −90° corresponds to a blade angle for which the leading edge of the blade is located towards the rear.

The blade angle of the blades of the propeller is adapted as a function of flight conditions: for example, on the ground the blade angle is near 10°, at takeoff, between 35° and 45°, and climbing, between 45° and 60°. In cruise mode, the blade angle is near 65°.

The blade angle at 90° is conventionally called "feathered position" or "feather" by the man skilled in the art, the blade angle at 0°, "flat" position, and the blade angle at −30°, "reverse" position (this position brakes the aircraft).

The device 1 comprises a radial shaft 6 whereof rotation modifies blade angle of the blade 2. Conventionally, the blade 2 is connected to the radial shaft 6 by a pivot.

The device also comprises pieces 8, 10, capable of being moved jointly according to an axial direction 5 of the device 1 so as to cause rotation of the radial shaft 6.

The piece 8 is generally a tie rod 8, whereof one end is connected to the radial shaft 6, and whereof the other end is connected to an asymmetrical piece 10. Each tie rod 8 is connected to a radial shaft 6 of a blade 2. According to case, the end 15 can be connected to a bar 29 (called anti-rotation bar by the man skilled in the art) connected to the piece 10, as explained hereinbelow.

The device 1 further comprises at least one actuator 12 controlling displacement of the pieces 8, 10 according to the axial direction 5.

The blade angle of the blade 2 is modified by the axial extension of the rod of the actuator 12, which acts on the pieces 8, 10 in axial translation.

In the absence of control of the pieces 8, 10 by the actuator 12, the blade 2 tends to adopt a blade angle at 0°, due to its inertia. The absence of control can especially result from a breakdown of the control unit controlling the actuator 12, or a breakdown of the actuator 12. As emphasised earlier, this position is harmful to control of the aircraft.

The device 1 comprises at least one main spring 13.

A first end 14 of the spring 13 is connected to the rotor 3.

A second end 15 is connected to one of the pieces 8, 10 or 29 capable of moving especially according to the axial direction 5.

This second end 15 presents displacement with a course which is shifted relative to the first end 14 according to a direction 7 orthogonal to the axial direction 5. Therefore, one end of the spring 13 moves on an axis or a curve shifted relatively to the embedded end 14 of the spring 13.

The profile of the course of the second end 15 depends on the piece on which this second end 15 is fixed.

This course is generally of rectilinear or curvilinear type.

Besides, the main spring 13 exerts resilient force tending to displace the pieces 8, 10 towards a position in which the blade angle of the blade is at 90°, in the absence of control of the pieces 8, 10 by the actuator 12.

Therefore, in the absence of control of the pieces in axial translation, the blade 2 tends to be brought towards a horizontal position by the device 1.

Figure 9:
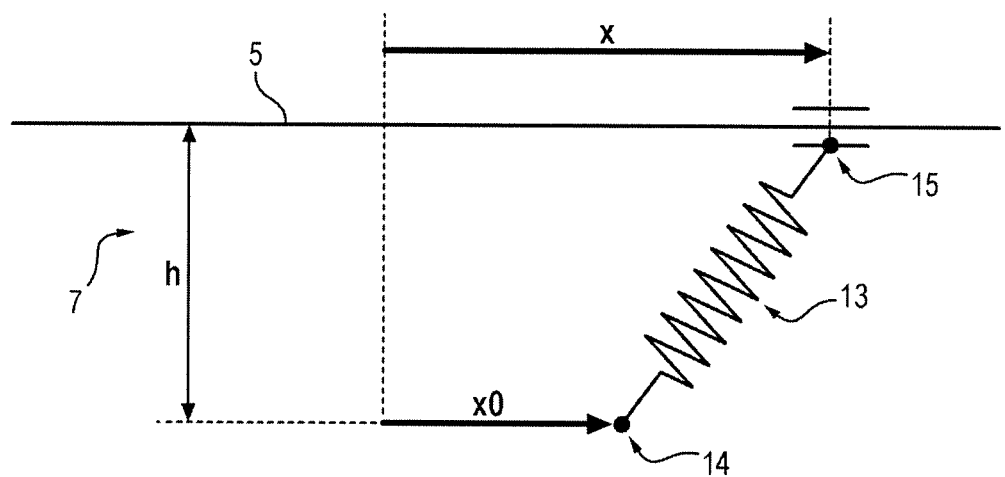
FIG. 9 is a representation of an embodiment of a main spring of the device.

FIG. 9 schematically illustrates the configuration of an embodiment of the main spring 13 in the case of a rectilinear course of its second end 15.

In this drawing, the second end 15 moves according to the axial direction 5 (position x). The course of the second end 15 is shifted by a distance h according to the direction 7 orthogonal to the axial direction.

The axial force exerted by such a spring is non-linear as a function of the axial displacement of its second end 15, and can be modelled by the following equation (with k the stiffness of the spring, h the distance between the first end and the sliding axis of the second end, l0 the resting length of the spring, and x0 the abscissa of the point of embedding):

$$F(x) = -k \cdot \left( \sqrt{h^2 + (x-x0)^2} - l0 \right) \cdot \frac{(x-x0)}{h}$$

The adapted choice of the different parameters of the spring 13 counters the force exerted by the blade 2 on the actuator 12, and, where needed, counters it integrally.

Figure 10:
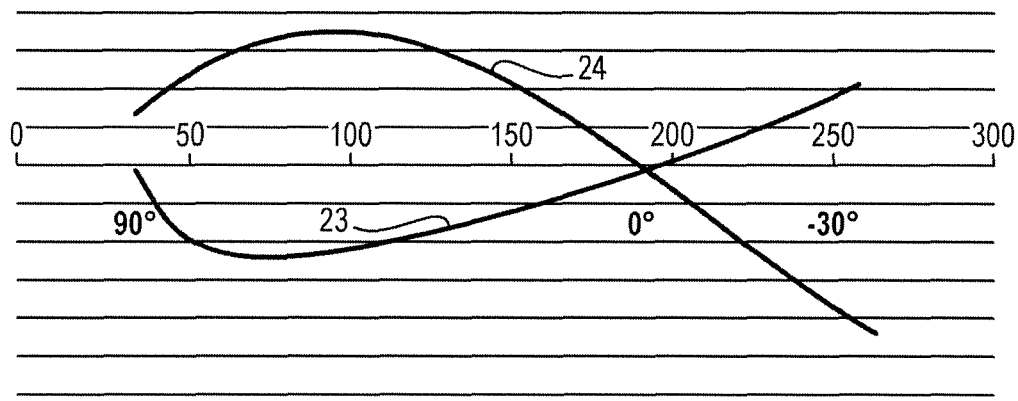
FIG. 10 is a representation of an embodiment of axial forces exerted by the main spring of the device and by the blade, as a function of the axial course of the pieces and of the actuator.

In FIG. 10, the curve 23 represents the force exerted by the blade 2 on the actuator 12, in the absence of control of the pieces by the actuator 12, as a function of the axial displacement of the actuator 12 (and therefore of the blade angle of the blade 2, which is shown schematically on the axis of the abscissae).

The curve 24 represents the axial force exerted by the main spring 13 on the pieces 8, 10, and therefore on the actuator 12.

As is evident, the axial force exerted by the spring 13 counters the inertia of the blade 2 to lead it towards a blade angle at 90°.

According to the characteristics of the main spring 13, the latter exerts resilient force tending to displace the pieces 8, 10 towards a position in which the blade angle of the blade is at 90°, from an initial position of the pieces for which the blade angle of the blade 2 is between −30° and +90°. Therefore, the device 1 displaces the blade 2 towards the feathered position even if the blade angle of the blade 2 is negative, for example in "reverse" position.

The fact of fixing the second end 15 to one of the pieces 8, 10 places the device close to the point where the kinematics differ for each blade 2. Therefore, this avoids a common mode of failure of all the blades.

If the second end 15 is fixed to the actuator 12, this causes the risk of failure common to all the blades 2.

In an embodiment, the device 1 presents at least one stop 17 for limiting axial displacement of the pieces 8, 10.

This stop 17 is especially useful for preventing the spring 13 tending to displace the blade 2 beyond the blade angle at 90°, or under the effect of the main spring 13, the actuator 12 comes to an axial stop, which is harmful to the latter.

Therefore, according to an aspect of this embodiment, the stop 17 prevents axial displacement of the pieces 8, 10 beyond a position for which the blade angle is the "feathered position".

According to a variant, the device 1 comprises at least one secondary spring 18 configured to exert axial resilient force on the pieces 8, 10, which opposes the resilient force exerted by the main spring 13 on the pieces 8, 10.

This spring 18 is arranged according to the axial direction 5 of the device 1. According to an example, one of its ends can be fixed to the rotor 3, while the other end is free, and interacts when the pieces 8, 10 approach its position.

This secondary spring 18 exerts axial resilient force on the pieces 8, 10 when the latter are located in a position for which blade angle is greater than $+(90-\theta)°$, $\theta$ being positive. $\theta$ is for example between 10° and 20°.

Therefore, as for the stop 17, this secondary spring 18 prevents the pieces 8, 10 from moving beyond a certain axial position, in particular when the latter exceed the feathered position.

Figure 11:
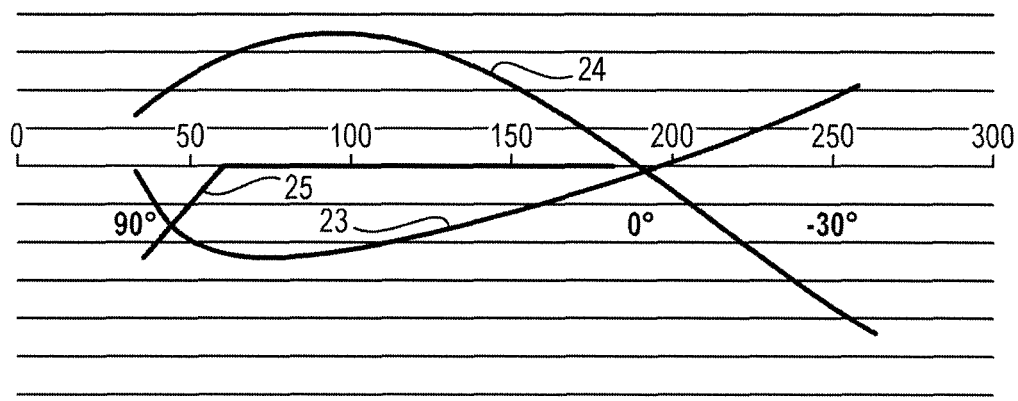
FIG. 11 is a representation of an embodiment of axial forces exerted by the main spring of the device, by a secondary spring, and by the blade, as a function of the axial course of the pieces and of the actuator.

The axial force exerted by this spring 18 on the pieces 8, 10 is illustrated in FIG. 11 by the curve 25. It is noted that this spring 18 opposes the main spring 13 when the feathered position (90°) is close.

In case of rupture of the main spring 13, the secondary spring 18 modifies the position of equilibrium of the pieces 8, 10 and of the actuator 12 (when the engine is stopped and no force is being exerted by the actuator 12).

This makes any rupture of the main spring 13 visible during pre-flight inspection of the aircraft, as blade angle of the blades 2 will be abnormal. This secondary spring 18 therefore also constitutes a security element, reducing the possibility of hidden faults of the device 1.

It is noted that this secondary spring 18 can be used jointly with the above stop 17. This reduces the force undergone by the stop 17, and limits clearance of the pieces at the level of the feathered position, making sizing of the stop 17 easier.

It is advantageous to select the value of $\theta$ for the secondary spring 18 such that this spring 18 becomes active outside the ranges of blade angle utilised by the aircraft as stabilised operation (takeoff and cruise phases, where the blade angle is between 30° and 65°).

This prevents repeated shocks on the spring 18 and/or on the stop 17, by more or less 0.5° at a few Hz, these shocks being caused by oscillations of the regulation of the engine.

According to an embodiment, the device 1 comprises at least one tertiary spring 20, configured to exert axial resilient force on the pieces 8, 10, which opposes the resilient force exerted by the main spring 13 on the pieces 8, 10, when the latter are located in a position for which the blade 2 exerts force on the pieces 8, 10 tending to displace them towards a position for which the blade 2 presents a positive blade angle.

In fact, it is evident on the positive part of the curve 23 of the FIG. 10 that the blade 2 tends, for some positions of the pieces 8, 10 (and therefore blade angle of the blade), to exert force tending to displace them towards a position corresponding to a positive blade angle.

This force is exerted in the preferred direction, since the device 1 seeks to return the blade 2 to the feathered position in the absence of control of the actuator 12.

Figure 12:
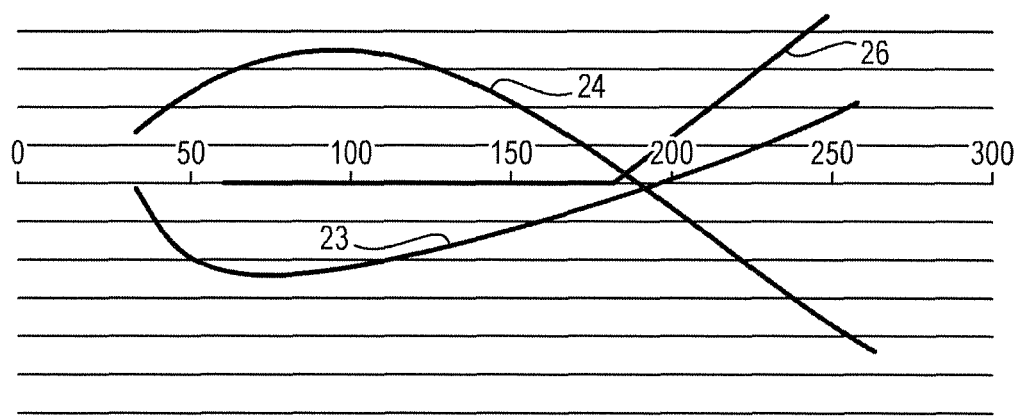
FIG. 12 is a representation of an embodiment of axial forces exerted by the main spring of the device, by a tertiary spring, and by the blade, as a function of the axial course of the pieces and of the actuator.

To prevent the opposition of the main spring 13 to this beneficial force of the blade 2, the tertiary spring 20 is configured to exert axial resilient force on the pieces 8, 10, which opposes the resilient force exerted by the main spring 13 on the pieces 8, 10 (curve 26 in FIG. 12). In particular, the tertiary spring 20 counters the main spring 13 when the pieces 8, 10 are located in a position for which the blade angle is in an interval whereof the terminals are $(-30+\beta)°$ and $(-30)°$, $\beta$ being positive. These are therefore positions close to the "reverse" position.

$\beta$ is for example between 20° and 35° for shrouded aircraft propellers. As for the secondary spring 18, $\beta$ is selected to prevent excessively frequent stresses in the blade angle ranges as stabilised operation.

This tertiary spring 20 is arranged according to the axial direction of the device 1. According to an example, one of its ends can be fixed to the rotor 3, while the other end is free, and starts acting when the pieces 8, 10 approach its position.

According to need, the device 1 can comprise one main spring 13 only, or be accompanied by the secondary spring 18 and/or the tertiary spring 20, and/or the stop 17 where needed.

Examples of Embodiments of the Device

Figure 3:
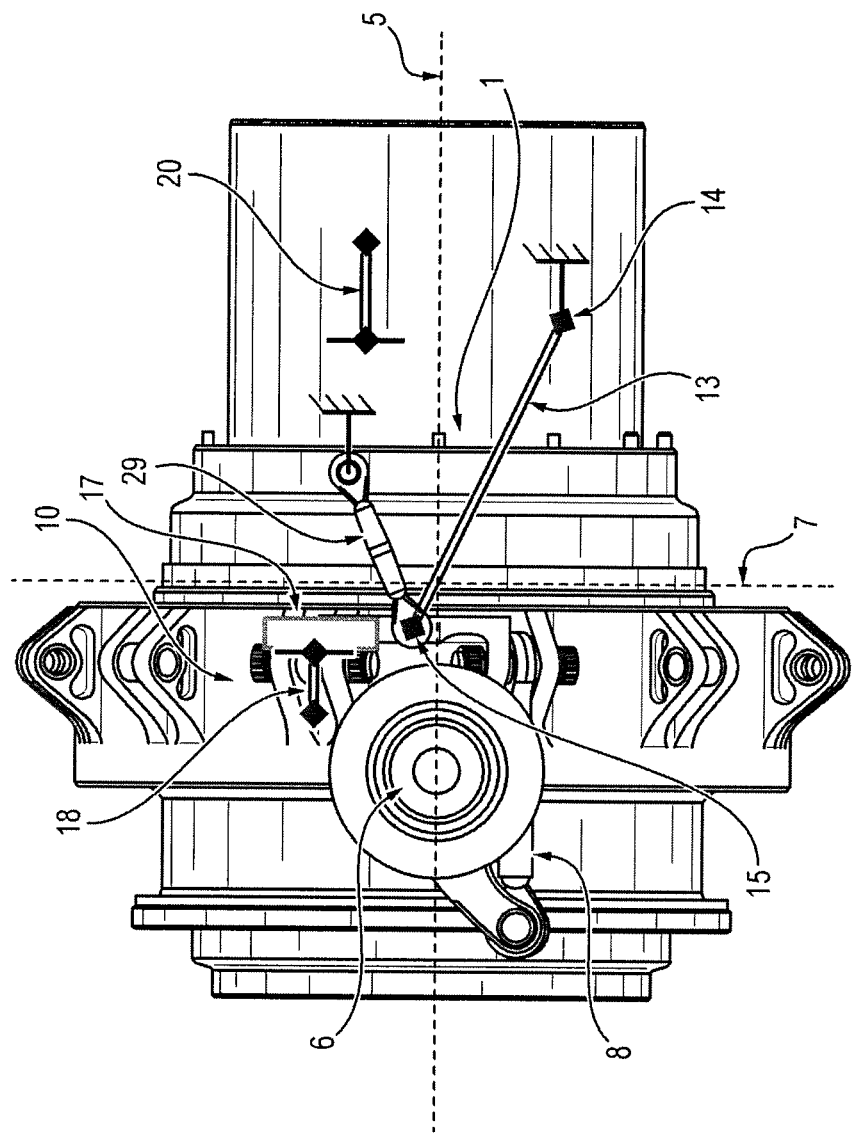
FIG. 3 is a representation of an embodiment of the device in a feathered position.
Figure 4:
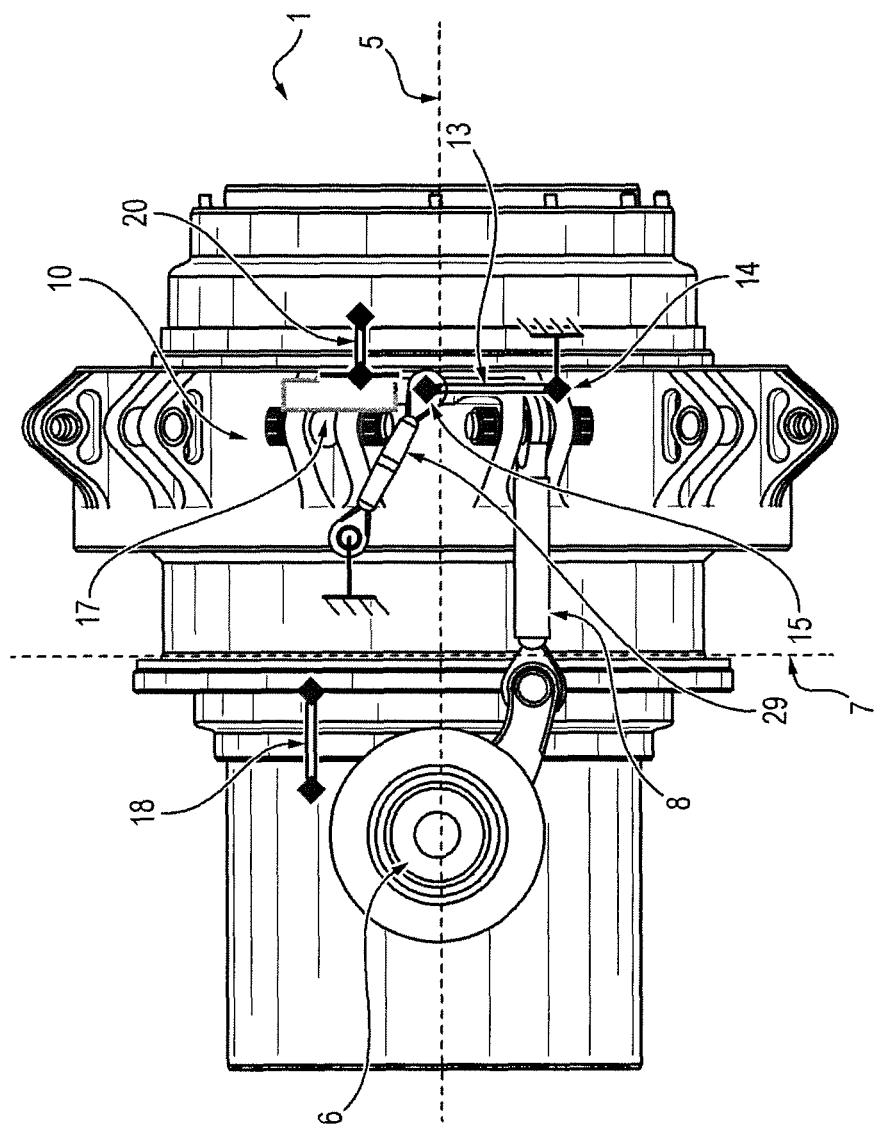
FIG. 4 is a representation of an embodiment of the device in a "reverse" position.

In FIGS. 3 and 4, the device 1 is illustrated in the case of a rotor 3 of a propeller 4 generally located upstream of a turbomachine.

In FIG. 3, the blade 2 is near the feathered position. The main spring 13 operates to push the pieces towards this position. The secondary spring 18 operates to limit axial displacement of the pieces 8, 10 beyond a limit. The tertiary spring 20 is at rest.

In this example, the end 15 of the main spring 13 is fixed to the asymmetrical piece 10, or to an anti-rotation bar 29 (this bar 29 is connected at one end to the rotor 3 by a pivot link and at the other end to the piece 10). The course of the end 15 is therefore curvilinear, shifted relatively to the end 14. In fact, during axial displacement of the jack 12 the anti-rotation bar 29 engenders rotation of the piece 10 about its axis.

In FIG. 4, the blade 2 is near the "reverse" position. The main spring 13 operates. The tertiary spring 20 operates to repel the pieces 8, 10 towards the feathered position. The secondary spring 18 is at rest.

Figure 5:
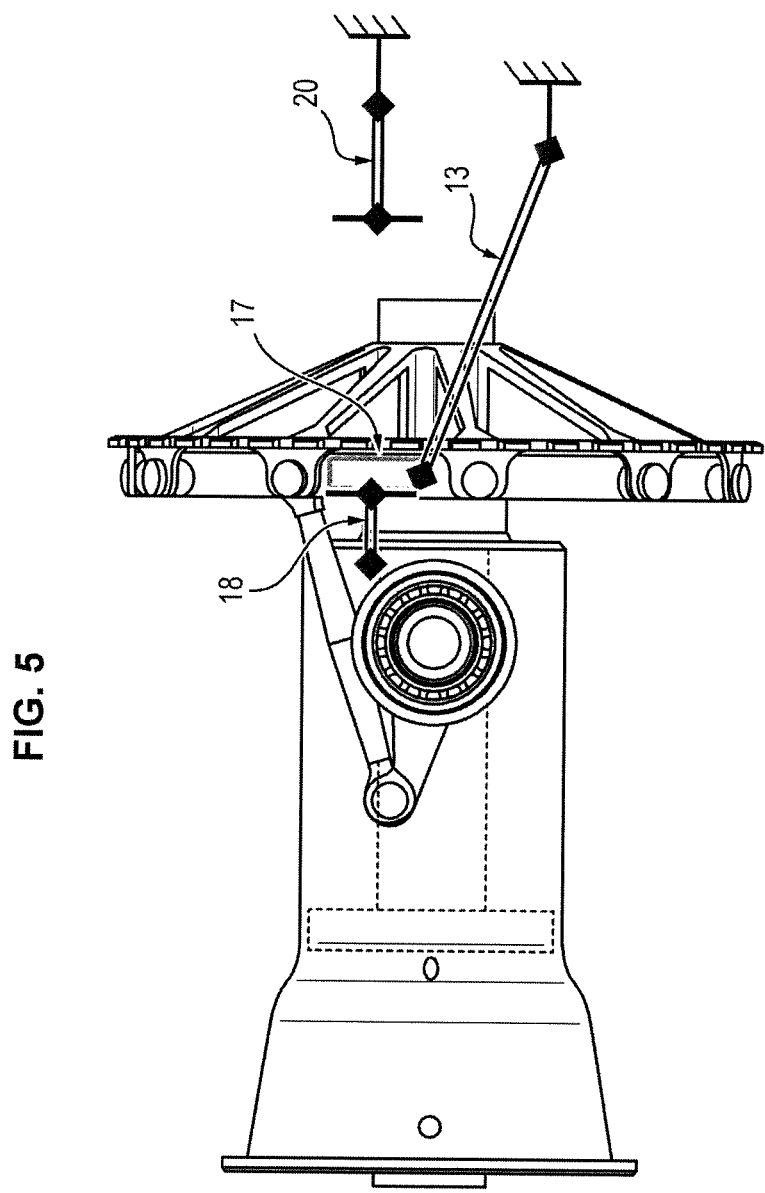
FIG. 5 is a representation of another embodiment of the device in a feathered position.
Figure 6:
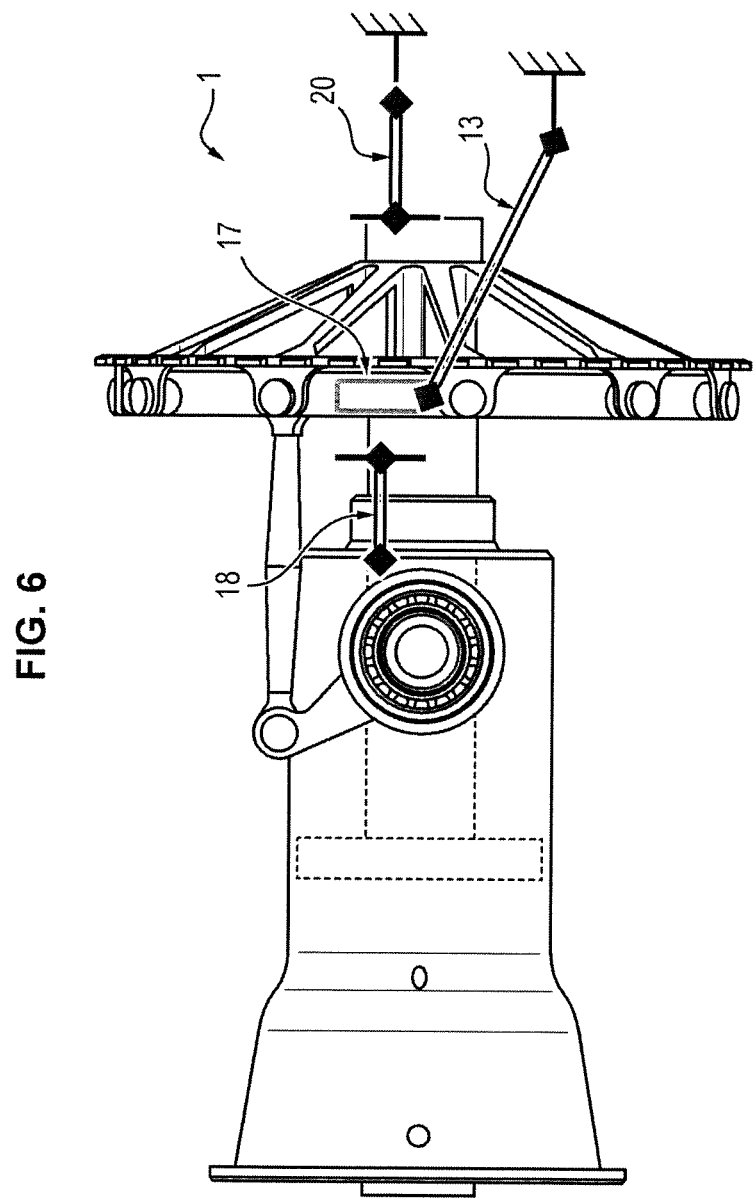
FIG. 6 is a representation of another embodiment of the device in an intermediary position, between the feathered and "reverse" position.
Figure 7:
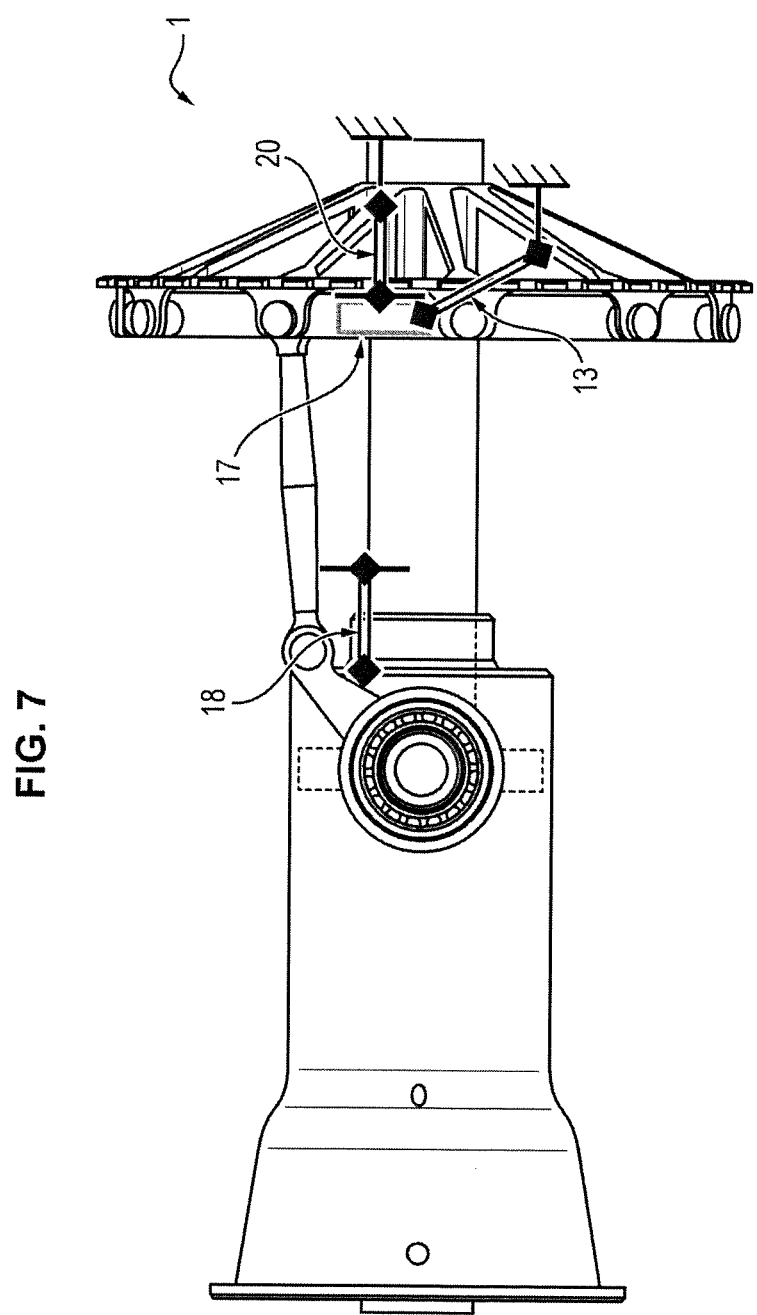
FIG. 7 is a representation of another embodiment of the device in a "reverse" position.
Figure 8:
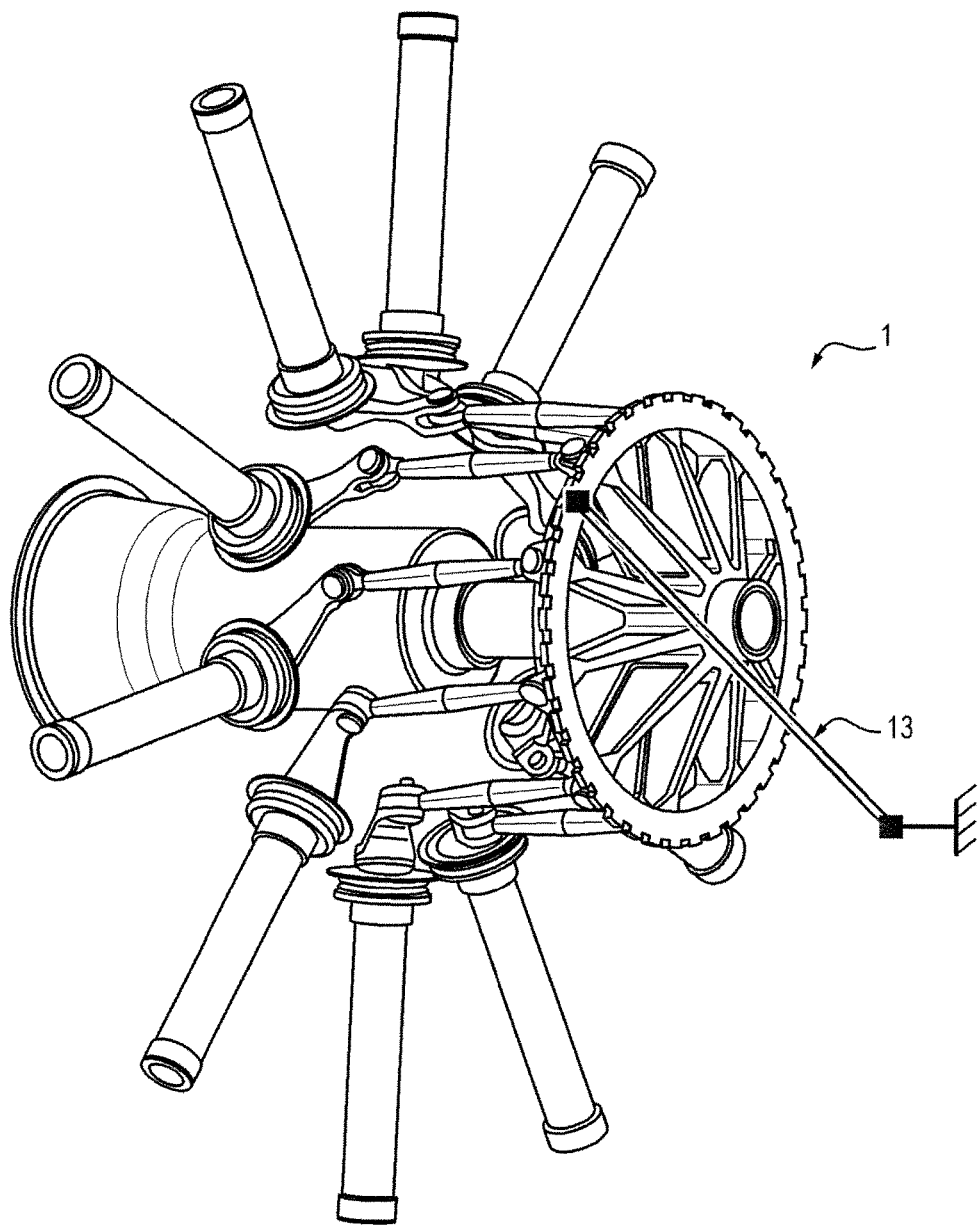
FIG. 8 is a representation of an embodiment of the device in the case of a plurality of blades.

In FIGS. 5 to 7, the device 1 is illustrated in the case of a rotor 3 of a propeller 4 generally located downstream.

In FIG. 5, the pieces 8, 10 are located near the feathered position. In FIG. 6, the pieces 8, 10 are located in an intermediary position, where neither the secondary spring 18 nor the tertiary spring 20 operates (for example for a blade angle between 30 and 65°). In FIG. 7, the pieces 8, 10 are located near the reverse position.

In this example, the actuator 12 is not connected to the piece 10 by an anti-rotation bar. The end 15 of the main spring is fixed to the piece 10 or the tie rod 8. The end 15 of the main spring 13 exhibits a rectilinear course according to the axial direction, shifted relatively to the end 14.

The device 1 is integrated into a propeller 4 comprising a rotor 3 and blades 2 at a variable blade angle. According to an embodiment, the device comprises a main spring 13 for each blade 2. The main spring 13 is for example fixed to each tie rod 8 of each blade 2 (in FIG. 8, a single spring 13 is shown).

The device 1 can comprise a single spring 13 for all the blades, or two springs 13 for improving the stability and symmetry of the mechanism. The device 1 can further comprise a plurality of main springs.

The invention claimed is:

1. A control device (1) for the blade angle of the blades (2) of a rotor (3) of a propeller (4), comprising:

a radial shaft (6) whereof the rotation modifies the blade angle of the blade (2), pieces (8, 10) capable of being displaced jointly according to an axial direction (5) of the device (1), so as to cause rotation of the radial shaft (6), at least one actuator (12) controlling displacement of the pieces (8, 10) according to the axial direction (5);

characterized in that it comprises:

at least one main spring (13) with a first end (14) connected to the rotor (3), and with a second end (15) connected to one of the pieces (8, 10), the second end (15) presenting a displacement with a course which is shifted relatively to the first end (14) according to a direction (7) orthogonal to the axial direction (5), the main spring (13) exerting resilient force tending to displace the pieces (8, 10) towards a position in which the cord (16) of the profile of the blade (2) is orthogonal to the plane of rotation of the propeller (4), in the absence of control of the pieces (8, 10) by the actuator (12).

2. The device according to claim 1, wherein the main spring (13) exerts resilient force tending to displace the pieces (8, 10) towards a position in which the cord (16) is orthogonal to the plane of rotation of the propeller (4), from an initial position of the pieces (8, 10) for which the cord (16) presents an angle between −30° and +90° with the plane of rotation of the propeller (4).

3. The device according to claim 1, wherein the device (1) has at least one stop (17) for limiting axial displacement of the pieces (8,10).

4. The device according to claim 3, wherein the stop (17) prevents axial displacement of the pieces (8, 10) beyond a position for which the cord (16) presents an angle greater than a feathered position.

5. The device according to claim 1, comprising at least one secondary spring (18) configured to exert axial resilient force on the pieces (8, 10) which opposes the resilient force exerted by the main spring (13) on the pieces (8, 10).

6. The device according to claim 5, wherein the secondary spring (18) exerts axial resilient force on the pieces (8, 10) when the latter are located in a position for which the cord (16) presents an angle greater than or equal to $+(90-\theta)°$ with the plane of rotation of the propeller (4), $\theta$ being positive.

7. The device according to claim 1, further comprising at least one tertiary spring (20), configured to exert axial resilient force on the pieces (8, 10), which opposes the resilient force exerted by the main spring (13) on the pieces (8, 10), when the latter are located in a position for which the blade exerts force on the pieces (9, 10) tending to displace them towards a position for which the cord (16) presents an angle positive with the plane of rotation of the propeller (4).

8. The device according to claim 7, wherein the tertiary spring (20) is configured to exert axial resilient force on the pieces (8, 10) which opposes the resilient force exerted by the main spring (13) on the pieces (8, 10) when the latter are located in a position for which the cord (16) presents an angle in an interval whereof the terminals are $(-30+\beta)°$ and $(-30°)$, $\beta$ being positive.

9. A propeller comprising a rotor (3) and blades (2), characterized in that it comprises a control device (1) of the blade angle of the blades (2), according to claim 1.

10. The propeller according to claim 9, wherein the device comprises a main spring (13) for each of the blade (2).

* * * * *